(12) United States Patent
Austermeier et al.

(10) Patent No.: US 12,043,112 B2
(45) Date of Patent: Jul. 23, 2024

(54) PEDAL FOR A MOTOR VEHICLE

(71) Applicant: Hella GmbH & Co. KGaA, Lippstadt (DE)

(72) Inventors: Werner Austermeier, Schloß Holte-Stukenbrock (DE); Kerim Florian Huge, Lippstadt (DE); Andreas Mueller, Lippstadt (DE); Ralf Ridder, Lippstadt (DE); David Schliwa, Bielefeld (DE); Claus Viethen, Erwitte (DE); Bernd Schmitt, Lippstadt (DE); Robert Schuermann, Herzebrock-Clarholz (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/651,189

(22) Filed: Feb. 15, 2022

(65) Prior Publication Data

US 2022/0169116 A1 Jun. 2, 2022

Related U.S. Application Data

(63) Continuation of application No. PCT/EP2019/072398, filed on Aug. 21, 2019.

(51) Int. Cl.
*B60K 26/02* (2006.01)
*G05G 1/44* (2008.04)

(52) U.S. Cl.
CPC ............. *B60K 26/021* (2013.01); *G05G 1/44* (2013.01)

(58) Field of Classification Search
None
See application file for complete search history.

(56) References Cited

U.S. PATENT DOCUMENTS

| 8,806,978 B2 * | 8/2014 | Saito ................... B60K 26/021 74/513 |
| 2003/0154817 A1 * | 8/2003 | Staker ...................... G05G 1/30 74/513 |
| 2007/0193401 A1 * | 8/2007 | Campbell .............. B60K 26/02 74/560 |

(Continued)

FOREIGN PATENT DOCUMENTS

| DE | 102006035882 A1 | 2/2008 |
| DE | 102009032664 A1 | 1/2011 |

(Continued)

*Primary Examiner* — Vicky A Johnson
(74) *Attorney, Agent, or Firm* — Husch Blackwell LLP

(57) ABSTRACT

A pedal for a motor vehicle is provided, having a pedal arm with at least one first resetting spring and with a friction system comprising a separate friction element and a friction surface of the base part corresponding to the separate friction element. The friction system features a rocker arranged in a rotatable manner on the base part and the at least one first resetting spring is arranged between the separate friction element and the rocker. The separate friction element is connected in a pressure-transmitting manner with the pedal arm by the at least one first resetting spring and at least one connection element. At least one second resetting spring is arranged between one bearing part connected in a pressure-transmitting manner with the pedal arm by the at least one connection element and the base part or the rocker.

7 Claims, 3 Drawing Sheets

(56) References Cited

U.S. PATENT DOCUMENTS

2019/0163227 A1* 5/2019 Kadoi .................... G05G 5/05

FOREIGN PATENT DOCUMENTS

| DE | 102015106479 A1 | 10/2016 |
| DE | 102018202470 A1 | 8/2018 |
| EP | 2987046 B1 | 6/2017 |
| FR | 3066628 A1 | 11/2018 |

* cited by examiner

PEDAL FOR A MOTOR VEHICLE

CROSS-REFERENCE TO RELATED APPLICATIONS

The present invention claims priority to and is a continuation of PCT Application No. PCT/EP2019/072398, filed Aug. 21, 2019, the entirety of which is incorporated herein by reference.

FIELD OF THE INVENTION

The present invention relates to a pedal for a motor vehicle.

BACKGROUND

Such pedals for motor vehicles are already known from numerous embodiment variants of the state of the art.

For example, a bi-directional pedal arrangement for a motor vehicle is known from EP 2 987 046 B1 where a pedal bearing part is mounted on a base structure such that it can pivot. The pedal bearing part is pivotable from a resting position around a rotary axis in a first direction and a second direction opposite to the first direction. First and/or second springs force the pedal bearing part into its resting position. A first or a second friction mechanism is arranged in each case between the pedal bearing part and the first or second spring, where the first and the second friction mechanism are each designed to brake the pivoting movements of the pedal bearing part. The first and the second friction mechanism for generating a friction force during a movement of the pedal bearing part each feature two elements that bear against each other and are movable in relation to each other and are designed in such a way that when the two elements are pressed away from each other under the application of force at least one surface of one of the elements is pressed against a surface that is fixed in relation to the base structure.

BRIEF SUMMARY OF THE INVENTION

This is where the present invention comes in.

The present invention is based on the task of providing a pedal for a motor vehicle in which resetting of a pedal arm of the pedal to its resting position is improved.

This task is solved by a pedal for a motor vehicle in which the friction system features a rocker arranged to be rotatable on a base part and the at least one first resetting spring between the separate friction element and the rocker is arranged in such a way that when the pedal arm is moved in the direction of its maximum actuating position the separate friction element is pressed by means of the rocker against the friction surface of the base part in a manner causing friction, where the separate friction element is connected to the pedal arm in a manner applying pressure by means of the at least one resetting spring and at least one connection element and where at least a second resetting spring carrying out the movement of the pedal arm in the direction of its resting position is arranged between a bearing part connected in a manner applying pressure with the pedal arm by means of the at least one connection element for the at least one second resetting spring and the base part or the rocker. The subclaims address advantageous refinements of the invention.

One advantage of the inventive pedal for a motor vehicle is in particular that resetting of the pedal arm of the pedal in its resting position is improved. The friction partners of a friction pairing, namely the separate friction element and the corresponding friction surface of the base part can, for example, block so that in such a case a relative movement between the two friction partners is prevented or at least made much more difficult. The inventive design of a pedal for a motor vehicle improves movement of the pedal arm of the pedal in the direction of its resting position, i.e. resetting of the pedal arm of the pedal, even in such a case.

This is due to the fact that the separate friction element is firstly connected by means of the at least one connection element to the pedal arm merely in a manner that applies pressure. Secondly, due to the fact that the at least one second resetting spring does not act by means of the separate friction element but by means of the at least one connection element between the pedal arm and the base part or is arranged and acts between the pedal arm and the rocker. Furthermore, resetting of the pedal arm of the pedal into its resting position is carried out by means of the at least one second resetting spring even if the at least one first resetting spring is non-functional. This is, for example, the case if the at least one first resetting spring is itself blocking or is broken.

The at least one connection element can be selected at will within wide suitable limits in terms of type, functioning, material, dimensions, arrangement and number. An advantageous refinement of the inventive pedal for a motor vehicle specifies that the at least one connection element is designed as a coupling rod. This implements the at least one connection element with a simple and mechanically robust design.

Another advantageous refinement of the inventive pedal for a motor vehicle specifies that the at least one connection element is designed as a single connection element. This reduces the number of the at least one connection element to a minimum. The number of components of the inventive pedal are also correspondingly reduced. It is, however, also conceivable that at least one connection element is used for the pressure-applying connection of the pedal arm with the separate friction element and at least one different connection element is used for the pressure-applying connection of the pedal arm with the bearing part for the at least one resetting spring.

In principle, the friction system and thus also the separate friction element of the inventive pedal for a motor vehicle can be selected at will within wide suitable limits in terms of type, functioning, material, dimensions, arrangement and number. One advantageous option is, when the friction system and the at least one first resetting spring are functioning properly, for the separate friction element to be in a force transmission connection with the pedal arm merely by means of the at least one first resetting spring and the at least one connection element. This reduces the interaction between the separate friction element and the pedal arm with regard to the force transmission to a minimum necessary for the functioning of the inventive pedal for a motor vehicle. Correspondingly, unwanted impact on the movement of the pedal arm, for example when the separate friction element and the corresponding friction surface of the base part are blocked, is effectively prevented or at least effectively reduced.

One especially advantageous refinement of the inventive pedal for a motor vehicle specifies that the at least one second resetting spring is designed in such a way that if the friction system and/or the at least one first resetting spring of the pedal arm is/are not functioning properly the pedal arm can be automatically transferred into its resting position when the pedal arm is not being actuated. This ensures the desired resetting of the pedal arm into its resting position in every operating state of the inventive pedal arm and also in the event of any failure of the friction system and/or the at least one first resetting spring.

In principle, the arrangement of the separate friction element and the bearing part to each other can be selected at will within wide suitable limits. One advantageous option is for the separate friction element and the bearing part to run essentially parallel to each other and to be arranged directly adjacent to each other. In this respect, the arrangement relates to the power flow. Firstly, this simplifies the technical design of the inventive pedal for a motor vehicle. Secondly, this facilitates a compact and thus space-saving design of the inventive pedal.

The bearing part for the at least one second resetting spring can be selected at will within wide suitable limits in terms of type, functioning, material, dimensions, arrangement and number. An advantageous refinement of the inventive pedal for a motor vehicle specifies that the bearing part is designed as a sensor part by means of which a rotation angle of the pedal arm can be determined relative to the base part. This makes it possible to detect the rotation angle of the pedal arm with a simple design. By means of the rotation angle, it is also possible to determine values dependent on the rotation angle of the pedal arm and use them, for example, for controlling or regulating the motor vehicle.

The at least one first resetting spring and the at least one second resetting spring can be selected at will within wide suitable limits in terms of type, functioning, material, arrangement and number. One advantageous refinement of the inventive pedal for a motor vehicle specifies, however, that the spring force lines of action of the at least one first resetting spring and the at least one second resetting spring essentially run parallel to each other. This improves the synergy between the at least one first resetting spring and the at least one second resetting spring when the inventive pedal for a motor vehicle is functioning properly. The at least one first resetting spring and the at least one second resetting can be designed to be coordinated with each other in order to complement each other in normal operation of the inventive pedal for a motor vehicle, i.e. when the inventive pedal is working properly and thus to be able to implement a more compact design of the individual first and second resetting springs.

A further advantageous refinement of the inventive pedal for a motor vehicle specifies that the at least one first resetting spring and/or the at least one second resetting spring is/are designed as a double spring. This improves the safety regarding malfunction of the at least one first resetting spring and/or the at least one second resetting spring.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
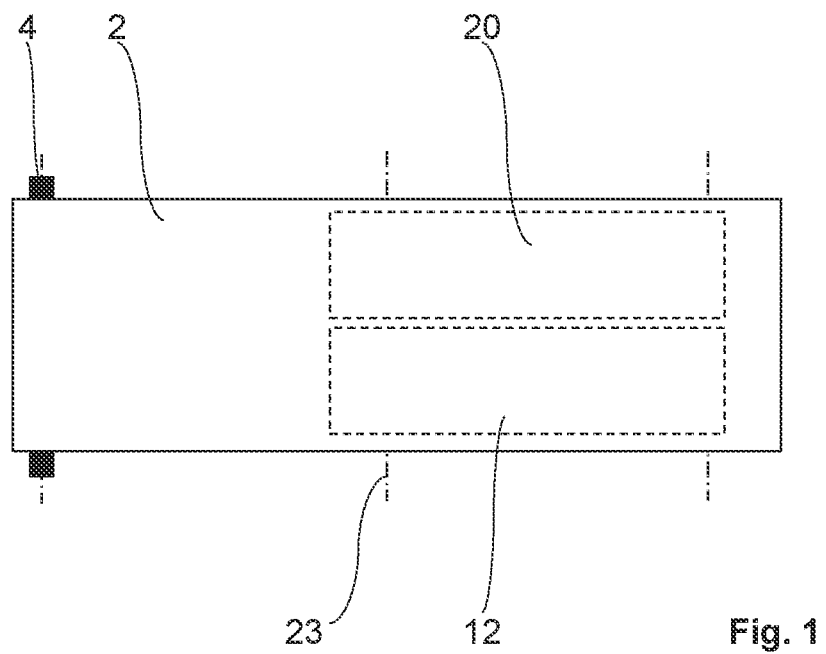
FIG. 1 illustrates a sample embodiment of an inventive pedal for a motor vehicle in a partial top view.

FIG. 1 shows a sample embodiment of an inventive pedal for a motor vehicle as an example. The motor vehicle is not shown. The pedal is designed as an accelerator pedal of the motor vehicle.

Figure 2:
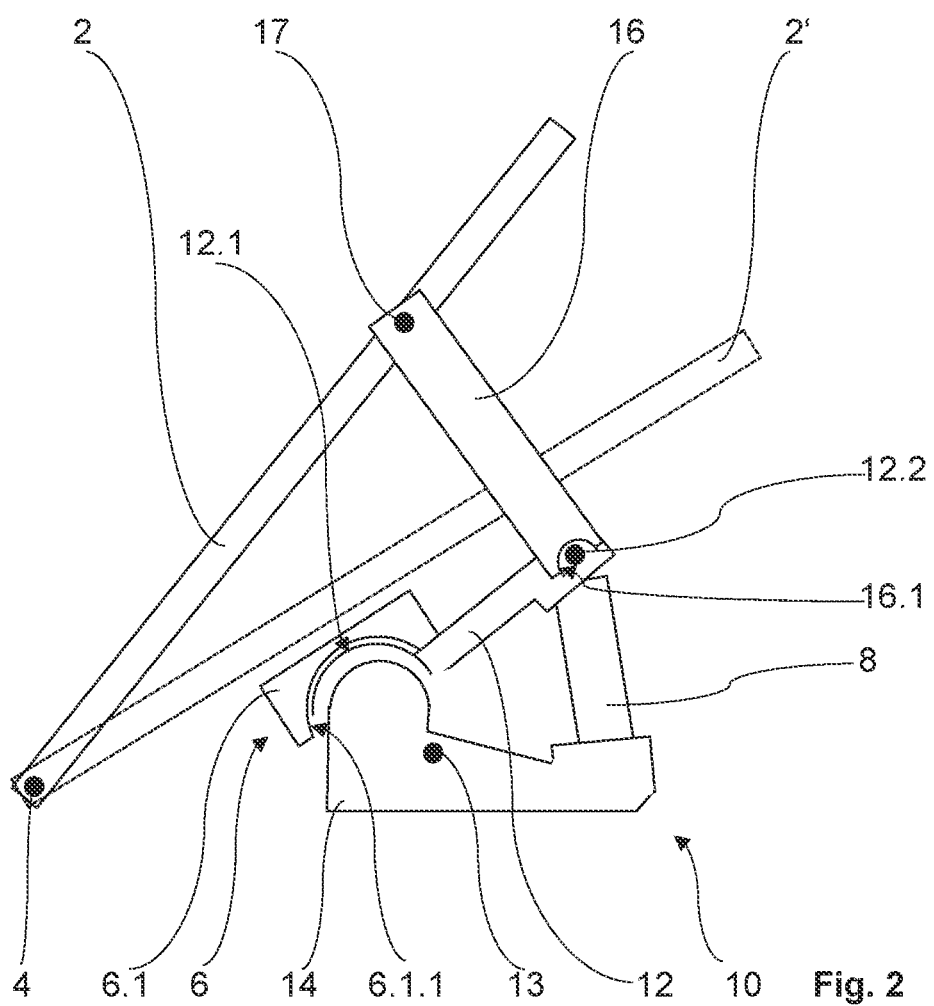
FIG. 2 illustrates the sample embodiment according to FIG. 1 in a partial first side view looking at the separate friction element and the first resetting spring.
Figure 3:
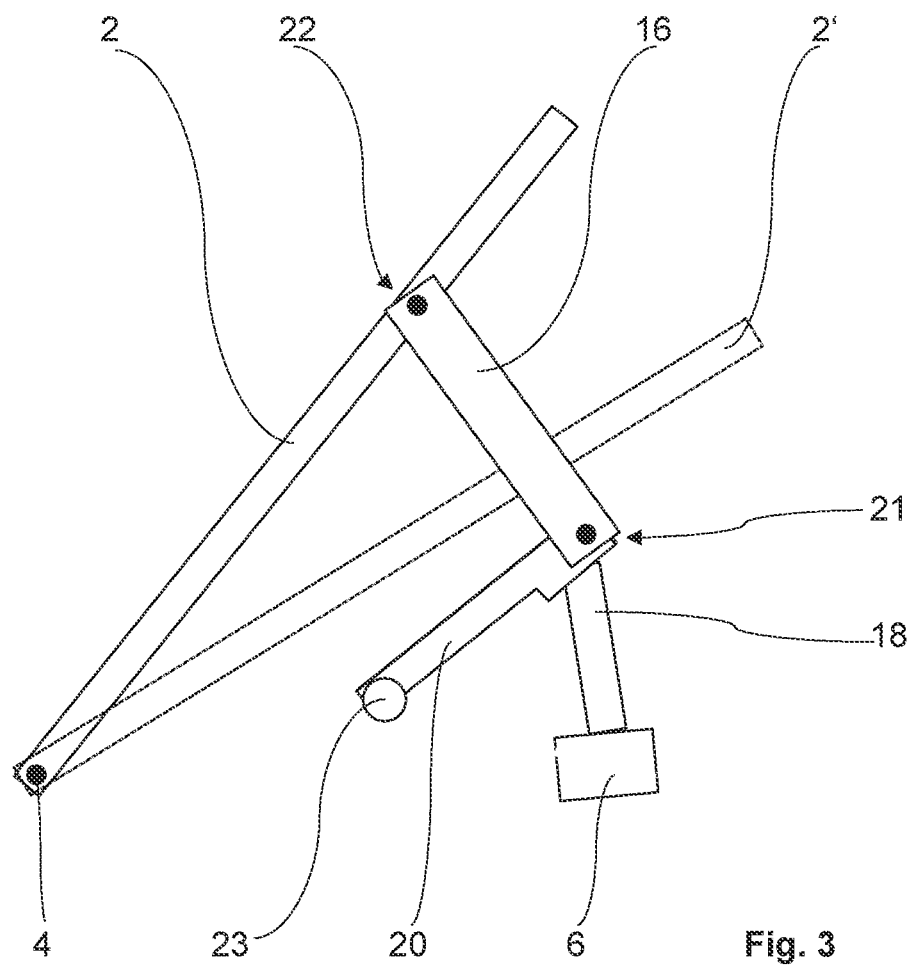
FIG. 3 illustrates the sample embodiment according to FIG. 1 in a partial second view looking at the bearing part and the second resetting spring.

The pedal features a pedal arm 2 that is mounted to be rotatable around a rotary axis 4 on a base part 6 only partially shown in FIG. 2 and FIG. 3 and can be moved to and fro between a resting position and a maximum actuating position. FIG. 1 through 3 show pedal arm 2 in its resting position while the maximum actuating position of the pedal arm 2 in FIGS. 2 and 3 is merely indicated by means of a pedal arm 2 shown using dashes. A movement of the pedal arm 2 in the direction of its resting position shown in FIG. 1 through 3 is carried out by means of a first resetting spring 8. The first resetting spring 8 is designed as a coil spring in the present sample embodiment.

Furthermore, the pedal features a friction system 10 for generating a friction force in the case of a movement of the pedal arm 2 in the direction of its maximum actuating position, see specifically FIG. 2. The friction system 10 features a separate friction element 12 and a friction surface 6.1.1 of a traverse 6.1 formed on the base part 6 designed to correspond to the separate friction element 12. A friction surface 12.1 of the separate friction element 12 is designed to correspond to the friction surface 6.1.1 of the base part 6; for this, see FIG. 2. As can be clearly seen from FIG. 2, the separate friction element 12 is designed in particular to be separate from the pedal arm 2.

The friction system 10 furthermore features a rocker 14 arranged on the base part 6 to be rotatable around a rotary axis 13, where the first resetting spring 8 is arranged between the separate friction element 12 and the rocker 14 in such a way that the separate friction element 12 is pressed by means of the rocker 14 against the friction surface 6.1.1 of the base part 6 in a manner causing friction in the case of a movement of the pedal arm 2 in the direction of its maximum actuating position, see FIG. 1 in conjunction with FIG. 2. The first resetting spring 8 is pretensioned in the resting position of the pedal arm 2 such that in the resting position of the pedal arm 2 the first resetting spring 8 presses the separate friction element 12 against a connection element 16 designed as a coupling rod. For this purpose, the separate friction element 12 features a bolt 12.2 by means of which the separate friction element 12 is supported at a bolt holder 16.1 formed at the coupling rod 16. The coupling rod 16 is connected in a force-transmitting and articulated manner with the pedal arm 2 via a joint 17. This means that the separate friction element 12 is connected to the pedal arm 2 by means of the first resetting spring 8 and the coupling rod 16 in a pressure-transmitting manner. The at least one connection element 16 designed as a coupling rod is thus designed in the present sample embodiment as a single connection element 16. In the case of a properly functioning pedal, the separate friction element 12 is connected in a pressure-transmitting manner with the pedal arm 2 by means of the first resetting spring 8 and the coupling rod 16 in every actuating position of the pedal and thus in every actuating position of the pedal arm 2.

A second resetting spring 18 carrying out the movement of the pedal arm 2 in the direction of its resting position is arranged between the base part 6 and a bearing part 20 for the second resetting spring 18. The bearing part 20 is connected in a force-transmitting and articulated manner with the pedal arm 2 by means of the coupling rod 16. For this purpose, a joint 21, 22 is formed in each case, firstly between the bearing part 20 and the coupling rod 16 and secondly between the coupling rod 16 and the pedal arm 2. The bearing part 20 is connected in a form-locked and articulated manner with the pedal arm 2 by means of the coupling rod 16. The bearing part 20 is connected to the base part 6 in a rotatable manner by means of a rotary axis 23. Furthermore, in the present sample embodiment, the bearing part 20 is at the same time designed as a sensor part 20 by means of which a rotation angle of the pedal arm 2 around the rotary axis 23 and relative to the base part 6 can be determined in a way known to a specialist. For this, see in particular FIG. 3. in which the base part 6 is shown in part.

In the present sample embodiment of the inventive pedal for a motor vehicle, the separate friction element 12 and the bearing part 20 are arranged directly adjacent to each other and run essentially parallel to each other. The design of the inventive pedal is correspondingly simplified and the inventive pedal for a motor vehicle is furthermore designed in a compact and thus space-saving manner.

The second resetting spring 18 is likewise designed as a coil spring 18 in line with the first resetting spring 8. The second resetting spring 18 is likewise pretensioned in the resting position of the pedal arm 2 so that the second resetting spring 18 holds the pedal arm 2 in its resting position by means of the coupling rod 16 when the pedal arm 2 is not being actuated. The second resetting spring 18 is arranged between the bearing part 20 and the base part 6 in such a way that the resetting spring 18 is connected in a pressure-transmitting manner with the pedal arm 2 in every actuating position of the pedal arm 2 both in the case of a properly functioning pedal and in the case of a friction system 10 that is not functioning properly and/or in the case of a first resetting spring 8 that is not functioning properly. Furthermore, the second resetting spring 18 designed in such a way that if the friction system 10 and/or the at least one first resetting spring 8 is/are not functioning properly the pedal arm 2 can be automatically transferred into its resting position when the pedal arm 2 is not being actuated.

In the present sample embodiment, the spring force lines of action of the first resetting spring 8 and the second resetting spring 18 run essentially parallel to each other.

In the following, the inventive pedal is explained in more detail as an example according to the present sample embodiment and on the basis of FIG. 1 through 3.

A user of the pedal, a driver of the motor vehicle equipped with the pedal actuates the pedal by pressing the pedal arm 2 downwards with their foot in the image plane of FIGS. 2 and 3. The user and their foot are not shown in the Figures. In doing so, the pedal arm 2 rotates around the rotary axis 4 relative to the base part 6 in the plane level of FIGS. 2 and 3 clockwise around the rotary axis 4 towards the bottom right. Due to the first resetting spring 8 arranged between the separate friction element 12 and the rocker 14, the separate friction element 12 is, in the case of a properly functioning pedal, pressed by means of the coupling rod 16 in a pressure-transmitting manner against the pedal arm 2 in every potential position of the pedal arm 2, from its resting position through to its maximum actuating position.

If the pedal is functioning properly, the bearing part 20 is likewise pressed against the pedal arm 2 by the second resetting spring 18 and the coupling rod 16 in a pressure-transmitting manner in every actuating position of the pedal, i.e. in every potential position of the pedal arm 2, from its resting position through to its maximum actuating position. Furthermore, the bearing part 20 is connected to the pedal arm 2 of the pedal in a form-locked and articulated manner by means of the coupling rod 16 and the two joints 21, 22. Differing from the separate friction element 12, this means that there is not only a pressure-transmitting connection between the bearing part 20 and the pedal arm 2 but also a tensile force-transmitting connection.

The user's application of force on the pedal arm 2 causes the first resetting spring 8 and the second resetting spring 18 are compressed against the respective spring force. In the aforementioned transfer of the pedal arm 2 from its resting position shown in FIG. 1 through 3 into its maximum actuating position of the pedal arm Z merely indicated in FIGS. 2 and 3, the separate friction element 12 moves relative to the base part 6. In line with this movement, the two friction surfaces 6.1.1 and 12.1 of the base part 6 corresponding to each other and of the separate friction element 12 move relative to each other. In doing so, the separate friction element 12 and thus the friction surface 12.1 formed on the same are pressed by the rocker 14 against the friction surface 6.1.1 formed on the traverse 6.1 of the base part 6 in a manner causing friction.

If the pedal is functioning properly, the pedal arm 2 of the pedal would be returned from the maximum actuating position of the pedal arm Z merely indicated in FIGS. 2 and 3 to the resting position of the pedal arm 2 shown in FIG. 1 through 3 due to the spring forces of the first resetting spring 8 and the second resetting spring 18 assuming that the user is no longer exerting any pressure on the pedal arm 2.

Should the pedal not be functioning properly according to the present sample embodiment because, for example, the friction system 10 and/or the first resetting spring 8 is/are no longer functioning properly, the second resetting spring 18 automatically presses the pedal arm 2 into its resting position if the pedal arm 2 is not being actuated. In this context, see in particular FIG. 3. For example, the first resetting spring 8 is functioning properly but the two friction surfaces 6.1.1 and 12.1 of the base part 6 corresponding to each other and the separate friction element 12 are blocked such that a relative movement between the two friction surfaces 6.1.1 and 12.1 and thus between the base part 6 and the separate friction element 12 is no longer possible. For this, see FIG. 2.

Despite this malfunction, the second resetting spring 18 transfers the pedal arm 2 into its resting position as desired; see in particular FIG. 3. One of the reasons making this possible is the fact that the friction element 12 is designed as a separate friction element 12 and is thus arranged and held on the pedal separately from the pedal arm 2. Correspondingly, the pedal arm 2 and thus resetting of the pedal arm 2 into its resting position is not prevented by a blocked friction system 10 and/or by a non-functional first resetting spring 8.

Due to the connection of the separate friction element 12 with the coupling rod 16 by means of the bolt 12.2 and the bolt holder 16.1 that merely transmits pressure, any blocking of the friction pairing between the base part 6 and the separate friction element 12 formed by the friction surfaces 6.1.1 and 12.1 does not prevent a movement of the pedal arm 2 into its resting position. The same applies, for example, to a non-functional first resetting spring 8. In the aforementioned fault scenarios, the coupling rod 16 can lift away from the separate friction element 12 so that the pedal arm 2 can be returned by means of the second resetting spring 18 and the coupling rod 16 from its maximum actuating position to its resting position.

The invention is not limited to the present sample embodiment. For example, the inventive pedal for a motor vehicle can also be used and deployed advantageously for other functions of a motor vehicle. For example, the inventive pedal for a motor vehicle could also be designed as a brake pedal or a clutch pedal. Furthermore, the inventive pedal for a motor vehicle can also be designed as a so-called pendant pedal. Differing from this, the inventive pedal for a motor vehicle according to the present sample embodiment can be designed as a so-called standing pedal.

Differing from the present sample embodiment, it is possible for the at least one second resetting spring to be arranged between the bearing part for the at least one second resetting spring and the rocker. This additionally improves the synergy between the at least one first resetting spring and the at least one second resetting spring. In contrast, the embodiment according to the present sample embodiment ensures decoupling from the rocker of the at least one second resetting spring. Correspondingly, this inventive embodiment would also compensate for a malfunction of the rocker.

Deviating from the sample embodiment, it is also conceivable to use a plurality of the at least one first resetting spring and/or a plurality of the at least one second resetting spring. For example, it would be possible for the at least one first resetting spring and/or the at least one second resetting spring to be designed as a double spring. A double spring would be, for example, if an additional first resetting spring were to be arranged concentrically to the one first resetting spring of the above sample embodiment or an additional second resetting spring were to be arranged concentrically to the one second resetting spring of the present sample embodiment. This would improve the safety against malfunctions of the friction system and/or the at least one resetting spring and/or the at least one second resetting spring.

It would also be possible to replace the coil springs with other suitable types of spring known to a specialist for the at least one first resetting spring and the at least one second resetting spring. It is also conceivable that differing types of spring are used for the at least one first resetting spring and the at least one second resetting spring. The same applies to a plurality of first resetting springs and plurality of second resetting springs.

Deviating from the present sample embodiment, it is also possible for the base part and/or the separate friction element to be designed as several parts. For example, a friction part could be arranged on the base part and/or the separate friction element featuring the friction surface of the base part and/or the friction surface of the separate friction element.

We claim:

1. A pedal for a motor vehicle, the pedal comprising:
   a base part;
   a pedal arm rotatably mounted about a first rotary axis, wherein the pedal arm is moveable between a resting position and a maximum actuating position;
   a connection element including a proximal end coupled to the pedal arm and a distal end positioned and located opposite from the proximal end;
   a bearing part rotatably coupled to the distal end of the connection element and rotatably coupled to the base part about a second rotary axis;
   a resetting spring extending from the base part to the distal end of the connection element;
   a friction system including:
      a friction element in mechanical communication with the distal end of the connection element;
      a rocker rotatably coupled to the base part about a third rotary axis, the rocker including a first end and a second end;
      a friction system spring extending from the distal end of the connection element to the first end of the rocker; and
      wherein when the pedal arm is moved from the resting position to the maximum actuating position, the rocker rotates such that the second end of the rocker pushes the friction element into contact with a surface on the base.

2. The pedal in accordance with claim 1, wherein when the friction system is functioning properly, the friction element is in a force transmission connection with the pedal arm merely by the friction system spring and the connection element.

3. The pedal in accordance with claim 1, wherein the resetting spring is designed such that when the friction system is not functioning properly, the pedal arm can be automatically transferred into the resting position when the pedal arm is not being actuated.

4. The pedal in accordance with claim 1, wherein the friction element and the bearing part extend essentially parallel to each other and are arranged directly adjacent to each other.

5. The pedal in accordance with claim 1, wherein the bearing part is a sensor part by means of which a rotation angle of the pedal arm relative to the base part can be determined.

6. The pedal in accordance with claim 1, wherein a spring force line of action of the resetting spring and a spring force line of action of the friction system spring are arranged substantially parallel to each other.

7. The pedal in accordance with claim 1, wherein at least one of the resetting spring and friction system spring is a double spring.

* * * * *